United States Patent [19]
Dubots

[11] Patent Number: 5,196,389
[45] Date of Patent: Mar. 23, 1993

[54] CATALYTIC SYSTEM PARTICULARLY FOR THE POSTCOMBUSTION OF EXHAUST GASES AND A METHOD OF PRODUCING SUCH A SYSTEM

[75] Inventor: Dominique Dubots, Passy, France

[73] Assignee: Pechiney Electrometallurgie, Courbevoie, France

[21] Appl. No.: 873,198

[22] Filed: Apr. 24, 1992

[30] Foreign Application Priority Data

Apr. 29, 1991 [FR] France .................. 91 05771

[51] Int. Cl.$^5$ ............... B01J 27/224; B01J 27/22; C04B 35/52; C01B 31/36
[52] U.S. Cl. .................. 502/178; 423/213.2; 423/213.5; 423/439; 423/440; 501/87; 501/91; 501/92; 502/177; 502/179; 502/527
[58] Field of Search .............. 502/177, 178, 179

[56] References Cited

U.S. PATENT DOCUMENTS

| | | | |
|---|---|---|---|
| 3,189,472 | 6/1965 | Taylor | 501/88 |
| 4,073,866 | 2/1978 | Yamaki et al. | 502/178 |
| 4,536,358 | 8/1985 | Welsh et al. | 264/81 |
| 4,812,434 | 3/1989 | Pohlmann et al. | 502/178 |
| 4,948,573 | 8/1990 | Nadkarni et al. | 501/88 |

*Primary Examiner*—Paul E. Konopka
*Attorney, Agent, or Firm*—Dennison, Meserole, Pollack & Scheiner

[57] ABSTRACT

The invention relates to a catalytic system and to a method of producing such a system.

The catalytic system consists of a support on which the catalytically active product is deposited. The support has mechanical or physical properties which are of interest in terms of the required working conditions, but a poor specific surface area. The catalytically active product, a metallic carbide, is obtained by coating the support in a suspension of a reducible compound of the metal in a solution of an organic compound, carbonizing this compound, reducing the metallic compound and carburizing the metal. The carbide thus obtained has a high specific surface area.

Preferably, the support consists of silicon carbide produced by carbonizing a paste containing silicon, carbon and an organic resin.

The invention is applicable to any form of catalyst but in particular to the monolithic catalysts intended for treating exhaust gases.

23 Claims, No Drawings

CATALYTIC SYSTEM PARTICULARLY FOR THE POSTCOMBUSTION OF EXHAUST GASES AND A METHOD OF PRODUCING SUCH A SYSTEM

1) TECHNICAL FIELD

The invention relates to catalytic systems consisting of two components:
- a porous support, generally having no catalytic activity of its own;
- a layer of carbide deposited on the walls of the pores in the support and having a high specific surface area and catalytic surface activity.

These systems take the form of:
- either monolithic structures of various types, alveolate, honeycomb . . . ,
- or extruded products of various sizes,
- or lumps, granules, powders.

The interest in such systems lies in the fact that the catalytically active product does not necessarily have any mechanical properties (solidity, abrasion resistance . . .) or physical properties (thermal stability, resistance to thermal shocks, heat conductivity . . . ) required under the conditions in which they are used. It is therefore useful for these properties to be displayed by the support and for the catalytic function to be fulfilled by the deposited substance. Furthermore, as the catalytic product may be heavy or expensive while only its surface area is active, it is often advantageous to limit the quantity used.

This system can be applied to any type of catalysis. For the catalytic postcombustion of exhaust gases from motor vehicle engines for example the catalytic system will take the form of a monolithic honeycomb or alveolate structure in which the support will offer good mechanical and thermal properties. For other applications such as for example fluidised bed catalysis, the catalytic system will be in powder form.

2) STATE OF THE ART

Catalytic systems intended for treating exhaust gases from heat engines of vehicles set out to complete the combustion of the hydrocarbons constituting the fuels to form carbon dioxide and water and to convert the nitrous oxides into the most oxidised oxide: $NO_2$.

Generally, the said systems consist of a mechanical support of low specific surface area, more often than not of alumina, silica or cordierite. A coating of oxide with a high specific surface area, of alumina for example, is deposited on this mechanical support. On this final coating, then, the catalytically active phase is dispersed, consisting of salts of rate metals such as platinum or rhodium which are then reduced to the metallic state. These catalysts, although giving good results with regard to purification of engine combustion fumes, do nevertheless have certain disadvantages:
- the salts of platinum and rhodium are very expensive which has its repercussions on the cost of the catalysts;
- the coating of alumina or more generally oxide of high specific surface area is fragile and may lose some of its specific surface area by a sudden rise in temperature during the course of catalytic reaction, encouraged by the poor heat conductivity of the support;
- the oxide of high specific surface area generally has a pore distribution in which the pore sizes are less than 1 micrometer (10 angströms or 1000 nanometers) and almost no macroporosity larger than 1 micrometer. The result of this is that to facilitate access to the catalytic sites by the kinds of chemicals involved in the catalytic operation, it is necessary to use a support whose porosity in excess of 1 micrometer resolves this transfer problem;
- the recovery of the rare metals is hampered by the presence of reactive alumina which is likely to form definite compounds or solid solutions with these metals;
- finally, the three-stage production method contributes to the high cost of the whole.

In the most general field of catalyst production, U.S. Pat. No. 4 536 358 exists which, in order to obtain a porous product of metallic or metalloid carbide of suitable surface area and porous structure, uses a mineral oxide support (of alumina, for example) having these surface and porous structure characteristics. Deposited on this mineral support is a polymerisable organic product which is then pyrolysed and forms a layer of carbon compound. Finally, using vapour phase deposition techniques, the metal or metalloid from which it is desired to obtain the carbide is deposited on this layer. High temperature heat is applied and thus a carbide replica of the surface of the oxide support is obtained, whereupon the oxide can be eliminated, for example by dissolution.

It is worthwhile noting that in this process the surface and porous structure properties are imparted by the support and not by the particular conditions under which the carbide is obtained.

3) OBJECT OF THE INVENTION

The object of the invention is a process which consists of developing on a porous support having good mechanical and physical properties but a mediocre specific surface area, a catalytically active metallic carbide based coating with a large surface area.

Preferably, the invention also comprises the preliminary stage of producing a particular porous support consisting of silicon carbide.

The preliminary process of producing the support, like the main process for producing the catalytically active coating, employ the same principle:
- mixture of a metallic compound with an organic resin;
- carbonisation of the resin;
- reduction and carburetion of the metallic compound.

The method of producing the catalytic deposit of large surface area comprises:
- coating or impregnation of the porous support which is immersed into a suspension or solution of metallic oxides or other reducible compounds in a liquid organic product of suitable viscosity,
- carbonisation of the organic constituent of the suspension,
- the reduction and carburetion of the oxide or metallic compound contained in the suspension or solution.

The metallic carbides of the type $Mo_2C$, $W_2C$, etc. . . Their catalytic activity is enhanced by the presence of superficial oxycarbides.

The invention likewise has as object the catalytic systems composed of a support and of deposited metallic carbides of large specific surface area which are produced according to the method of the invention.

4) DESCRIPTION OF THE INVENTION

As has been indicated in the object of the invention, the method comprises a preliminary stage, obtaining the support, and a main stage, the production of the catalytic coating, each of these stages being itself constituted by successive phases.

4.1 First stage: Obtaining the support.

This first stage may consist simply of choosing a suitable support, having regard to the mechanical or physical properties required by the conditions under which the catalytic system is to function. For example, the choice will fall to conventional supports based on silica, alumina, cordierite (aluminium and magnesium silicate) or recently developed supports based on silicon nitride or compounds of silicon nitride and alumina (Sialons). It is worth mentioning that these supports may take the form of monolithic structures, extruded structures, powders...

This first stage may also consist of preparing a silicon carbide support. It then comprises the following phases:

a) Production of a mixture of powdered silicon and of agents capable of supplying carbon for subsequent carburetion of the silicon and of giving the mixture sufficient plasticity to allow it to be shaped under suitable conditions, for example by extrusion.

The carbon-furnishing agents are of two types:
an organic liquid polymerisable by heating or catalysis and which by its viscosity will contribute to the plasticity of the mixture obtained. Preferably, resins of the furfuryl or phenol type will be used;
carbon powder of the smoke black (carbon black) type and/or activated charcoal fines.

The proportions of these three components: silicon, resin, carbon powder, are determined in order to meet the following constraints:
assurance of the stoichiometric ratio of Si-C needed for formation of silicon carbide: a minimum of 12 g carbon to 28 g silicon. Well, there are two sources of carbon: powdered carbon black and/or activated charcoal and carbonisation of the organic liquid or rather of the polymer which results therefrom. Each organic resin is characterised by a carbon output or rate at carbonisation. One and the same quantity of carbon after carbonisation may therefore be achieved by different ratios between the quantities of solid carbon (carbon black and/or activated charcoal) and resin. This indetermination is overcome by the second constraint:
the need to be able to obtain a mixture of a plasticity suitable for shaping of the mixture and production of a product, for example by extrusion, which is fairly solid while green, that is to say before firing, so that it can be handled without damage, subject to certain precautions. This suitable plasticity obviously depends on the viscosity of the resin chosen but also on the proportions of liquid (resin) and solid (carbon black and powdered silicon).

b) Shaping of the mixture for instance by extrusion employing a known technique in order to obtain either a monolithic structure of a form suitable for use as a support for a catalyst in an exhaust system, for example in honeycomb form, or in the form of an extrudate, lumps or powders, followed by polymerisation of the resin.

c) Carbonisation of the mixture shaped to produce a monolith, an extrusion or powder. The object of this carbonisation is to pyrolyse the resin contained in the shaped mixture in order to convert it to carbon. It is carried out in a non-oxidising atmosphere at a temperature comprised between 600° C. and 1000° C. for a sufficient period to carbonise all the resins, generally 1 to 4 hours. In the case of blocks, they may be crushed, ground and screened in order to obtain calibration granules and powders.

d) Carburetion of the silicon. The object of this operation is to convert to silicon carbide the carbonised product obtained in the previous stage and consisting of a mixture of silicon and carbon. The operation is conducted in a non-oxidising but possibly nitriding atmosphere at a temperature comprised between 1350° C. and 1450° C., a temperature close to the melting temperature of silicon, over a period of 1 to 2 hours.

The support thus obtained is constituted by one monolithic structure, for instance of a honeycomb structure, or extrusions, granules or powders of porous silicon carbide. This support offers good mechanical strength, excellent resistance to thermal shocks, considerable chemical inertia and good thermal conductivity. On the other hand, its specific surface area is relatively poor: around 0.5 to 4 sq.m/g. Indeed, systematic tests have shown that when the carburetion temperature increases, the efficiency of conversion to SiC increases in the same way as the mechanical properties, but the specific surface area of the silicon carbide diminishes. In the method which is the object of the invention, preference is given to obtaining high mechanical and thermal characteristics by choosing a high carburetion temperature, close to the melting temperature of silicon.

4.2 Production of the catalytic surface

This second stage consists of the following phases:

e) Coating of the porous support chosen or produced during the course of the first stage by immersion in a suspension of reducible and finely crushed metallic oxides and of which the specific surface area BET is of the order of 5 to 20 sq.m/g in an organic product of adjusted viscosity. Instead of a suspension of oxides, it is possible to use a suspension or a solution of reducible metallic compounds. Coating is a conventional operation in ceramic techniques, consisting of covering a ceramic piece with a mineral or organic product by immersion in a more or less viscous solution or suspension, the quantity of product retained on the surface obviously being a function of the viscosity and surface tension of this solution or suspension. In the present case, the coating suspension used is a suspension of the oxide or mixture of oxides of the metal or metals of which it is desired to obtained a deposited carbide on the surface. The choice of this or these metallic oxide(s) is guided by various considerations:

The carbide and the oxycarbides formed in the subsequent stage may display a specific catalytic activity, for example the oxidation of combustion gases from engines. The oxide must be easily reducible by the carbon and carburable at relatively moderate temperatures.

These conditions are satisfied by molybdenum oxide $MoO_3$, tungsten oxide $WO_3$, vanadium oxide $V_2O_5$, but also by the oxides of tantalum, niobium, chromium and iron, this list not being limitative.

The organic medium in which the oxide is placed in suspension will be a solution of a polymerisable product, an organic resin, a pitch or a tar. Preferably, a heat-hardenable resin having a high level of residual carbon after carbonisation will be chosen: one which is capable of developing by pyrolysis a porous structure having a large specific surface area. There, too, the furfuryl and phenol resins are found to be particularly suitable.

The coating process which has just been described, followed by drying or possible stoving in order to eliminate the solvents and polymerise the resin, makes it possible to deposit on the walls of the SiC support a coating of powdered oxide dispersed in an organic polymer.

f) Carbonisation of the organic polymer deposited on the silicon carbide support. This is carried out as previously in a non-oxidising atmosphere, at a temperature comprised between 300° C. and 1000° C., for a sufficient period to carbonise all the resin, generally 1 to 4 hours. The result then is a dispersion of metallic oxides in a carbonated matrix with a large surface area, which is deposited on the SiC support.

g) Reduction of the oxide and carburetion of the metal. This final operation consists of raising the product obtained in the preceding stage to a temperature of between 700° C. and 1400° C. in a non-oxidising atmosphere for a period of 30 mins. to 4 hours so that on the SiC skeleton, there is formed a coating of metallic carbide of high specific surface area and having catalytic activity. This catalytic activity is linked with an incomplete reduction of metallic oxides, reflected in the presence of amorphous metallic oxycarbides on the surface. Subsequent treatments consisting of oxidations conducted at low temperature, of 300° C. to 700° C. according to the carbides concerned, may encourage the formation of these amorphous oxycarbide phases.

4.3 Possible alternatives

A number of alternatives may be applied to stage 4.2 above without department from the framework of the invention:

h) For certain readily carburable metals and of which the oxides are easily reducible, such as molybdenum and vanadium, the phases f) and g) provided for hereinabove may be carried out in a single treatment at a lower temperature, between 900° C. and 950° C. during the course of which carbonisation of the organic constituent, reduction of the oxide and carburetion of the metal are performed progressively.

For iron, phases f) and g) may likewise be merged into a single treatment which, in a non-oxidising but neutral atmosphere, must take place at around 1200° C. in order to achieve a deposition of metallic iron containing traces of iron carbide. Furthermore, the use of a carburising atmosphere constituted by a hydrocarbon such as propane for example makes it possible to lower the processing temperature to around 950° C. and makes it possible to obtain a deposit which is composed almost entirely of iron carbide.

i) The coating process described in e) above may be replaced by the impregnation treatments described hereinafter and which differ from it slightly:

Double impregnation (first type). The support is first impregnated with an aqueous or organic solution of a decomposable, reducible and carburable metallic salt. The support which has undergone this first impregnation is stoved then impregnated a second time by a solution of an organic reducing and carburising compound of the polymerisable resin type of adjusted viscosity. The polymerisation, carbonisation, reduction and carburetion processes are then performed.

Double impregnation (second type). Firstly the support is impregnated with a solution of an organic reducing and carburising compound of the adjusted viscosity polymerisable resin type. The resin impregnating the support is polymerised and then carbonised in order to create on the surface of the pores of the support a carbon coating with a high specific surface area. The support, carrying its carbon coating, is impregnated a second time with an aqueous or organic solution of a decomposable, reducible and carburable metallic salt and then stoved. The reduction and carburetion treatments are then performed.

Simple impregnation. The support is not impregnated with a suspension of metallic oxide in an organic liquid containing a dissolved resin, but with a solution of a metallic salt in such an organic liquid.

For all these alternatives, the metallic salts used are those of the metals indicated in 4.2 e), together with the solutions of organic compounds.

4.4 Product obtained

The product obtained is a catalytic system having the desired texture and/or form in order to improve contact between the catalyst and the gases: in monolithic alveolate or honeycomb structure, extrusions, granules of various shapes and sizes, powders, consisting:

of a support having good mechanic properties, an excellent resistance to thermal shocks, considerable chemical inertia, good heat conductivity and a relatively low specific surface area, a coating of carbides and oxycarbides of high specific surface area of metals belonging to the group: molybdenum, tungsten, vanadium, tantalum, niobium, chromium and iron.

5) EXAMPLES

Example 1

$Mo_2C$ catalytic system on an alumina-silicon nitride support.

The support consists of grains of sialon marketed by Pechiney Electrometallurgie under the trade mark NITRAL. Their granular size is comprised between 1 and 3.15 mm, their BET surface area is 0.62 sq.m/g, their porosity measured on a mercury porosimeter is 300 cu.mm/g, with a pore diameter comprised between 0.5 and 50 micrometers.

The impregnating suspension is a mixture of:
500 g LP 340 furfuryl resin from Quaker Oats Chemicals
500 g ethanol
100 g powdered molybdenum oxide $MoO_3$.

Impregnation. 100 g sialon grains are poured into the suspension and the whole is stirred for a few minutes then poured over a screen of 1 mm mesh in order to separate the grains from the suspension and to drain them. The drained and impregnated grains are then dried while being agitated in order to polymerise the resin while avoiding sticking.

Heat treatment. The dried and impregnated grains are placed in an oven under nitrogen scavenging, then heated to 1000° C. and maintained at this temperature for 2 hours. While the temperature is rising and during the plateau, both carbonisation of the resin and reduction of the molybdenum oxide are carried out, finishing with the almost complete carburetion to form a coating of $Mo_2C$ on the walls of the pores in the support.

The catalytic system obtained has a specific surface area of 33 sq.m/g, far higher than that of the support.

Example 2

This only differs from the previous example by virtue of the nature of the support which this time consists of silicon nitride ($Si_3N_4$) marketed by Pechiney Electrometallurgie under the trade mark NITROSIL 10.

These grains have a BET surface area and a pore distribution similar to those of the support in Example 1.

After impregnation and heat treatment, the granular catalytic system has a specific surface area BET of 45 sq.m/g.

Example 3

$Mo_2C$ catalytic system on a porous silicon carbide support.

The support consists of extruded products of silicon carbide, produced as follows:

A paste is produced which has the following composition:
- 3100 g LP 340 furfuryl resin from Quaker Oats Chemicals
- 2000 g ethanol
- 4500 g powdered silicon
- 2300 g carbon black.

After mixing to obtain an homogeneous paste, this paste is extruded in a press to form tiny rods 2 mm in diameter and approx. 5 mm long.

These rods, after evaporation of the solvent and polymerisation of the resin, are brought into a nitrogen atmosphere at a temperature of 800° C. for 2 hours in order to carbonise the resin completely. Still in a nitrogen atmosphere, they are then raised to a temperature of 1400° C. for 2 hours to carburise the silicon. Thus, a porous support of silicon carbide is obtained which has a specific surface area BET of only 0.5 sq.m/g.

The impregnation suspension is a mixture of:
- 500 g LP 340 furfuryl resin from Quaker Oats Chemicals
- 500 g ethanol
- 100 g $MoO_3$ powdered molybdenum oxide Impregnation. The silicon carbide rods are poured into the suspension and the whole stirred for a few minutes and then poured onto a 1 mm grid to separate them from the suspension and drain them off. The drained and impregnated rods are then dried under agitation to polymerise the resin while avoiding sticking.

Heat treatment. The dried and impregnated rods are placed in an oven under nitrogen scavenging then heated to 1000° C. and maintained at this temperature for 2 hours. While the temperature is rising and during the plateau, both carbonisation of the resin and reduction of the molybdenum oxide are performed, finishing off with almost total carburetion to form a coating of $Mo_2C$ on the walls of the pores of the support.

The catalytic system obtained has a specific surface area of 25 sq.m/g, far higher than that of the support.

Example 4

This only differs from Example 1 in that the viscosity of the resultant suspension is higher, achieved by halving the quantity of solvent, ethanol. The specific surface area BET of the catalytic system changes to 54 sq.m/g.

Example 5

System comprising iron carburised onto a sialon support.

The support consists of sialon grains marketed by Pechiney Electrometallurgie under the trade mark NITRAL. Their granular size is comprised between 1 and 3.15 mm, their surface area BET is 0.62 sq.m/g, their porosity measured with a mercury porosimeter is 300 cu.mm/g, with a pore diameter comprised between 0.5 and 50 micrometers.

The impregnation suspension is a mixture of:
- 500 g LP 340 furfuryl resin from Quaker Oats Chemicals
- 500 g ethanol
- 100 g iron oxide $Fe_2O_3$ (hematite) in powder form Impregnation. 100 g sialon are poured into the suspension and the whole stirred for a few minutes, then poured onto a screen of 1 mm mesh in order to separate the grains from the suspension and drain them off. The drained and impregnated grains are then dried under agitation in order to polymerise the resin while avoiding sticking.

Heat treatment. The dried and impregnated grains are placed in an oven under nitrogen scavenging, then heated to 1200° C. and maintained at this temperature for 2 hours. While the temperature is rising and during the plateau, carbonisation of the resin, reduction of the iron oxide are both performed, finishing with partial carburetion to form a slightly carburised coating of iron on the walls of the pores of the support.

The catalytic system obtained has a specific surface area of 35 sq.m/g, far higher than that of the support.

Example 6

A system comprising iron carbide on a silicon carbide support.

The support consists of grains of silicon carbide obtained by crushing rods produced as indicated in Example 3.

The impregnation suspension is a mixture of:
- 200 g LP 340 furfuryl resin from Quaker Oats Chemicals
- 200 g Printex 85 carbon black from Degussa
- 600 g iron oxide $Fe_2O_3$ (hematite) in powder form to which methanol is added to obtain a sufficiently fluid suspension.

Impregnation. The grains of silicon carbide are poured into the suspension and the whole is stirred for a few minutes, then poured onto a mesh in order to separate the grains from the suspension and drain them off. The drained and impregnated grains are then dried under agitation to polymerise the resin while avoiding sticking.

Heat treatment. The dried and impregnated grains are treated continuously in a rotary oven set at 950° C. under counter-current scavenging with propane. At the end of this treatment, there is formed on the surface of the pores of the support a coating of iron carbide of high specific surface area.

The catalytic system obtained has a specific surface area BET of 24 sq.m/g, far higher than that of the support. It has at the same time:
- the catalytic qualities of the deposit which will cover the walls of the pores and which has a high specific surface area;
- the mechanical (solidity, hardness) and physical (heat conductivity) properties of the silicon carbide support. In particular, its resistance to crushing, characterised by the BCS (bulk crushing strength) measurement is far better than 1.

Example 7

A system comprising tungsten carbide on a silicon nitride support.

Two-stage impregnation.

Grains of silicon nitride ($Si_3N_4$) marketed by Pechiney Electrometallurgie under the trade mark NITROSIL 10, of dimensions comprised between 1 and 3.15 mm are impregnated with tungsten salts by immersion in a hot aqueous solution saturated with metatungstic acid ($H_2W_4O_{13}, 9H_2O$). These grains are drained, dried in a ventilated oven and then plunged into a solution of furfuryl resinic alcohol at the rate of 50% by weight.

After drying in an oven, a treatment similar to that of Example 1 is carried out. The catalytic system has a specific surface area BET equal to 41 sq.m/g.

Example 8

A system comprising vanadium carbide on a silicon carbide support.

Two-stage impregnation.

Grains of silicon carbide produced as in Example 6 are plunged into an alcohol solution saturated with tetravanadic acid ($H_2V_4O_{11}$). These grains are drained, dried in a ventilated oven, then plunged into a solution of furfurylic resin in alcohol at the rate of 50% by weight.

After drying in an oven, the grains are treated at 700° C. for 2 hours under nitrogen.

The catalytic system has a specific surface area BET equal to 34 sq.m/g.

Example 9

A system comprising vanadium carbide on a silicon nitride support.

Single stage impregnation.

Grains of silicon nitride NITROSIL 10 are plunged into a dilute alcohol solution of tetravanadic acid ($H_2V_4O_{11}$) and furfurylic resin with an adjusted viscosity to the point of total impregnation. After draining, the grains are dried in an oven under agitation.

After drying in the oven, the grains are treated at 700° C. for 2 hours under nitrogen, as in Example 8. The catalytic system has a specific surface area BET equal to 25 sq.m/g.

What is claimed is:

1. A method of producing a catalytic system comprising a porous support of specific surface area less than 4 $m^2/g$ and a catalytically active coating of metallic carbides of greater specific surface area in the pores of said support, comprising the steps of:
    preparing a solution or suspension of suitable viscosity of a reducible compound of at least one of the metals selected from the group consisting of molybdenum, tungsten, vanadium, tantalum, niobium, chromium and iron, in an organic liquid containing either an organic resin, a polymerizable product, a pitch or a tar diluted in a solvent;
    coating of or impregnating a preformed porous support having a specific surface area less than 4 $m^2/g$ by immersion in said solution or suspension;
    drying the coated or impregnated support to eliminate solvent or organic liquid, producing a polymerized resin and leaving on the support only the polymerized resin and reducible compound;
    carbonizing the polymerized resin; and
    heating at a temperature of 700° C. to 1400° C. to reduce and carburize the reducible compound.

2. A method of producing a catalytic system comprising a porous support of specific surface area less than 4 $m^2/g$ and a catalytically active coating of metallic carbide of greater specific surface area in the pores of said support, comprising the steps of:
    impregnating a preformed porous support having a specific surface area less than 4 $m^2/g$ with an aqueous or organic solution of a reducible compound of at least one of the metals selected from the group consisting of molybdenum, tungsten, vanadium, tantalum, niobium, chromium and iron;
    drying the impregnated support to eliminate the solvent and leaving only the reducible compound on the support;
    impregnating the dried porous support by immersion in a solution of suitable viscosity of organic polymerizable resin in an organic liquid;
    drying the support to eliminate the the organic liquid, polymerizing the resin and leaving on the support only the reducible compound and the polymerized resin;
    carbonizing the polymerized resin; and
    heating at a temperature of 700° C.–1400° C. to reduce and carburize the reducible compound.

3. A method of producing a catalytic system comprising a porous support of specific surface area less than 4 $m^2/g$ and a catalytically active coating of metallic carbide having a greater specific surface area in the pores of said support, comprising the steps of:
    impregnating a porous support of specific surface area less than 4 $m^2/g$ by immersion in a solution of suitable viscosity of an organic polymerizable resin in an organic liquid;
    drying the impregnated support to eliminate the liquid, polymerizing the resin and leaving only the polymerized resin on the support;
    carbonizing the polymerized resin;
    impregnating the porous support covered with carbonized resin with an aqueous or organic solution of a reducible compound of at least one of the metals selected from the group consisting of molybdenum, tungsten, vanadium, tantalum, niobium, chromium and iron;
    drying the impregnated support to eliminate the solvent of the reducible compound; and
    heating to a temperature of 700° C.–1400° C. to reduce and carburize the reducible compound.

4. A method of producing a catalytic system according to claim 1, 2 or 3, wherein the support consists essentially of silicon or aluminum oxides or magnesium and aluminum silicate.

5. A method of producing a catalytic system according to claim 1, 2 or 3, wherein the support consists essentially of silicon nitride or a compound based on silicon nitride and alumina.

6. A method of producing a catalytic system according to claim 1, 2 or 3, wherein the support is silicon carbide produced by shaping, by extrusion, of a paste comprising a mixture of powdered silicon and agents supplying carbon selected from the group consisting of powdered carbon black, powdered activated charcoal, mixtures thereof and a viscous polymerizable organic liquid, polymerizing, carbonizing and finally carburizing the silicon contained in the shaped support, and wherein said paste comprises proportions of powdered silicon and said agents which are determined such that the ratio of the weight of carbon emanating from said agents to the weight of silicon corresponds to the stoichiometric composition of the silicon carbide.

7. A method of producing a catalytic system according to claim 6, wherein the viscous polymerizable organic liquid is a furfurylic or phenolic resin.

8. A method of producing a catalytic system according to claim 6, wherein the shaped support is carbonized in a non-oxidizing atmosphere at a temperature between 600° C. and 1000° C. for a period of 1 to 4 hours.

9. A method of producing a catalytic system according to claim 6, wherein the silicon is carburized in a non-oxidizing atmosphere at a temperature between 1350° C. and 1450° C. over a period of 1 to 2 hours.

10. A method of producing a catalytic system according to claim 9, wherein the silicon is carburized in a nitriding atmosphere.

11. A method of producing a catalytic system according to claim 1, wherein the reducible compound is in suspension in an organic liquid which is a heat hardening resin having a residual carbon level which is high after carbonization and which is capable by pyrolysis of developing a porous structure having a large specific surface area.

12. A method of producing a catalytic system according to claim 11, wherein the heat hardenable resin is a furfurylic or phenolic resin.

13. A method of producing a catalytic system according to claim 1, 2 or 3, wherein carbonization of the polymerized resin is conducted in a non-oxidizing atmosphere at a temperature between 300° C. and 1000° C. over a period of 1 to 4 hours.

14. A method of producing a catalytic system according to claim 1, 2 or 3, wherein said heating to reduce and carburize takes place in a non-oxidizing atmosphere for a period of 30 minutes to 4 hours so that there is formed on the support a coating of metallic carbides of high specific surface area and having catalytic activity.

15. A method of producing a catalytic system according to claim 1 or 2, wherein carbonizing the polymerized resin and heating to reduce and carburize takes place in one single step at a temperature between 900° C. and 950° C.

16. A method of producing a catalytic system according to claim 1 or 2, wherein the reducible compound is an iron compound and carbonization of the polymerized resin and heating to reduce and partially carburize the iron compound take place in a single step at a temperature of about 1200° C. in a non-oxidizing atmosphere.

17. A method of producing a catalytic system according to claim 1 or 2, wherein the reducible compound is an iron compound and carbonization of the polymerized resin and heating to reduce and almost totally carburize the iron compound take place in a single step at a temperature of about 950° C. in a reducing and carburizing atmosphere.

18. A method of producing a catalyst system according to claim 1, 2 or 3, additionally comprising controlled oxidation of the catalytic system, at between 300° C. and 700° C., to promote the formation of amorphous oxycarbide phases.

19. A method of producing a catalytic system according to claim 1, 2 or 3, wherein the reducible compound is an oxide.

20. A catalytic system comprising a porous support and a deposited coating of catalyst on the pores of said support,:
    said support consisting essentially of silicon carbide having a specific surface area between 0.5 and 4 $m^2/g$ and having a texture and/or form selected from the group consisting of a monolithic alveolate, a honeycomb structure, extrudates, granules in various shapes and sizes, and powders;
    said deposited coating of catalyst consisting essentially of carbides of large specific surface area, of one or more metals selected from the group consisting of molybdenum, tungsten, vanadium, tantalum, niobium, chromium and iron.

21. A catalytic system according to claim 20, wherein the catalyst further includes at least one oxycarbide of said one or more metals.

22. A catalytic system comprising a porous support and a deposited coating of catalyst on the pores of said support,
    the support formed of silicon nitride or a compound of alumina and silicon nitride, and having a specific surface area of 0.5 to 4 $m^2/g$,
    the deposited coating consisting essentially of carbides having a large specific surface area, of one or more metals selected from the group consisting of molybdenum, tungsten, vanadium, tantalum, niobium, chromium and iron.

23. A catalytic system for the postcombustion of exhaust gases from engines, according to claims 20, 21 or 22, wherein the support is monolithic.

* * * * *